(12) United States Patent
Hull, Jr.

(10) Patent No.: US 7,946,221 B2
(45) Date of Patent: May 24, 2011

(54) BASTING APPARATUS

(76) Inventor: David Carlisle Hull, Jr., Spartanburg, SC (US)

( * ) Notice: Subject to any disclaimer, the term of this patent is extended or adjusted under 35 U.S.C. 154(b) by 545 days.

(21) Appl. No.: 11/807,071

(22) Filed: May 25, 2007

(65) Prior Publication Data

US 2007/0272087 A1   Nov. 29, 2007

Related U.S. Application Data

(60) Provisional application No. 60/809,069, filed on May 26, 2006.

(51) Int. Cl.
*A47J 37/10* (2006.01)
(52) U.S. Cl. ............................................. 99/346; 99/516
(58) Field of Classification Search .......... 426/520–523; 99/337–340, 345–347, 348, 352–355, 400, 99/401, 403–418, 444–450, 516
See application file for complete search history.

(56) References Cited

U.S. PATENT DOCUMENTS

| | | | | |
|---|---|---|---|---|
| 1,337,122 A | * | 4/1920 | Doak | 99/345 |
| 1,349,302 A | * | 8/1920 | Spitz | 99/346 |
| 1,471,219 A | * | 10/1923 | Sutton | 99/346 |
| 2,164,072 A | * | 6/1939 | Kitzeman | 99/346 |
| 2,400,405 A | * | 5/1946 | Getgey et al. | 99/346 |
| 2,560,605 A | * | 7/1951 | Shell | 99/346 |
| 3,311,048 A | * | 3/1967 | Pickering | 99/346 |
| 4,066,010 A | | 1/1978 | Larsson | |
| 4,102,258 A | * | 7/1978 | Strandine et al. | 99/532 |
| 5,163,968 A | * | 11/1992 | Lafferty | 5/200.1 |
| 5,421,254 A | * | 6/1995 | McDonald | 99/346 |
| 5,632,094 A | * | 5/1997 | Mills | 33/432 |
| 5,727,449 A | | 3/1998 | Healy et al. | |
| 5,913,965 A | | 6/1999 | Gargano | |
| 6,216,586 B1 | * | 4/2001 | Burgin | 99/339 |
| 6,796,219 B1 | * | 9/2004 | Rubin | 99/346 |
| 6,892,628 B2 | | 5/2005 | Northern | |

* cited by examiner

*Primary Examiner* — Geoffrey S Evans
(74) *Attorney, Agent, or Firm* — J. Bennett Mullinax, LLC

(57) ABSTRACT

An automatic basting apparatus is provided. The apparatus has a base that defines a cavity. A basting fluid dispensing member is present and defines a passageway in communication with the cavity. The basting fluid dispensing member is rigid. The basting fluid dispensing member is configured for dispensing basting fluid out of an outlet of the passageway at an end of the basting fluid dispensing member. The outlet is oriented to have a component in both the horizontal direction and vertical direction.

19 Claims, 4 Drawing Sheets

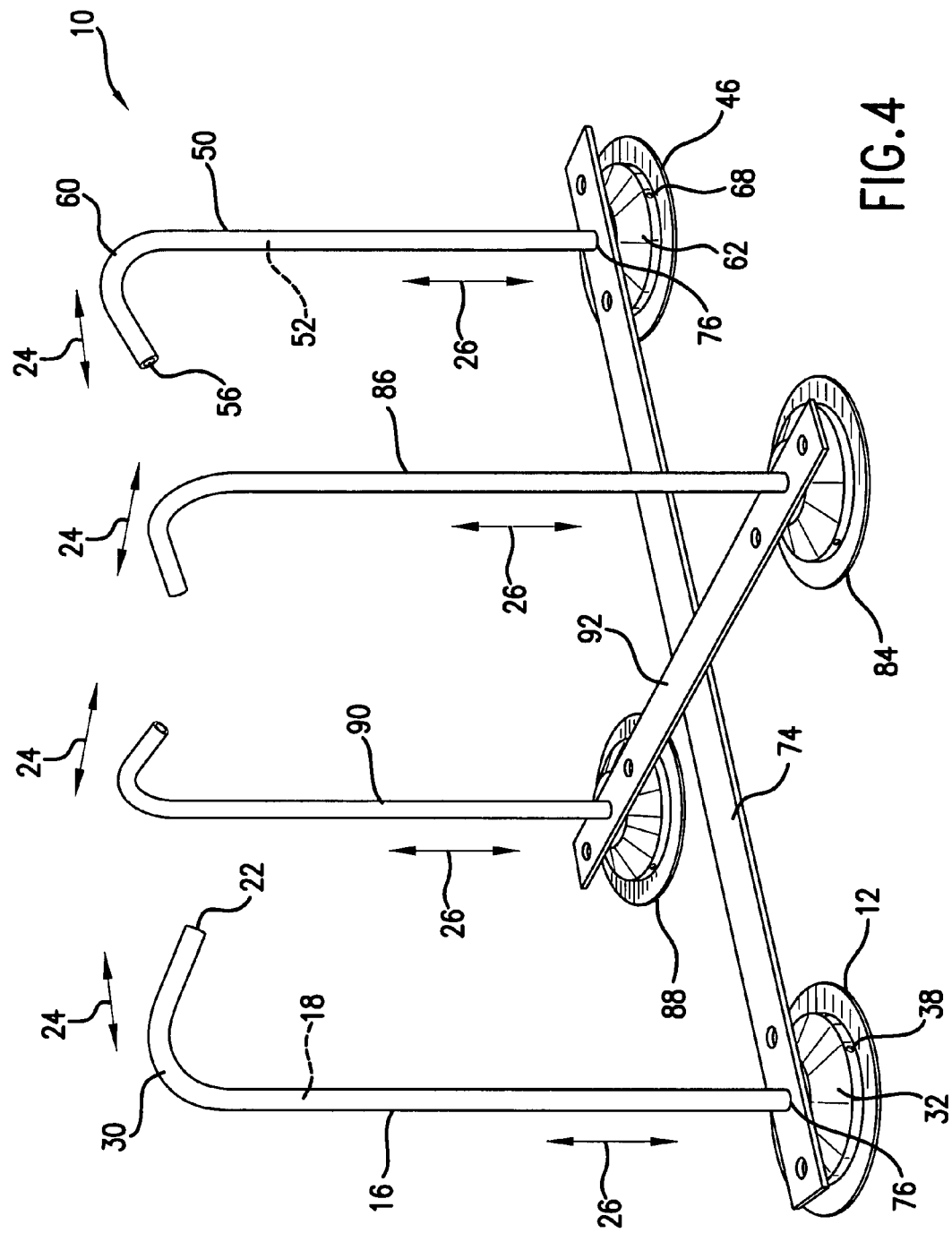

BASTING APPARATUS

CROSS-REFERENCE TO RELATED APPLICATIONS

This application claims the benefit of U.S. application Ser. No. 60/809,069 filed on May 26, 2006 and entitled, "Percobaster." U.S. application Ser. No. 60/809,069 is incorporated by reference herein in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

The present invention relates generally to a basting apparatus for use in automatically basting food. More particularly, the present application involves a basting apparatus that has a passageway through which basting fluids rise via pressure during cooking of the food for subsequent deposit onto the food.

Preparation of food items, such as meat, often requires periodic basting during the preparation process. This is done in order to prevent the meat from drying out and becoming tough while being cooked. The act of basting causes the meat to remain moist while being cooked and results in improved tenderness and taste.

It is common practice for the cook to apply basting fluids manually to the meat during the preparation process. For example, the meat may be located in a roasting pan that also includes juices and gravy. At certain intervals the cook will open the oven and lift the juices and gravy from the roasting pan with a spoon and subsequently pour these basting fluids over the meat. Alternatively, instead of using a spoon the cook may use a suction device to pull juices and gravy from the pan for subsequent application to the meat. Manual application of basting fluids to the meat has drawbacks and inefficiencies. For example, the cook may fail to apply the basting fluid evenly to the meat thus resulting in certain portions of the meat being basted properly while others are not properly basted. Further, the act of manually basting consumes much needed time of the cook that could otherwise be spent on preparing other items of the meal.

Automatic basting devices are known that eliminate the need for a cook to manually baste food during the preparation process. One such device employs multiple spray nozzles suspended in spaced relation along a tube and above the location in which the food will be positioned while being cooked. A pressurized source of basting fluid is provided and a timer device is present in order to open valves at specific intervals to cause the spray nozzles to dispense basting fluid onto the meat. Although such a device works well for its intended purpose it requires that a supply of compressed air or pressurized basting fluid be present during operation. Also, a great deal of time and money must be spent in order to retrofit certain ovens with such a basting device.

Other automatic basting devices have been proposed that employ a U-shaped standard in a roasting pan. Basting fluids condense in the upper portion and drip onto the meat. Although capable of being adjusted in the vertical direction the U-shaped standard cannot be adjusted in the lengthwise direction and hence may allow basting fluids to miss contact with the meat. Further, the U-shaped standard causes pressure in both of the legs of the standard to oppose one another thus resulting in a lesser amount of fluid application to the food.

Another automatic basting device includes a series of flexible tubes extending from a base that with the roasting pan defines a chamber. Meat is located on top of the base and water is ejected from the series of flexible tubes onto the meat. The flexible tubes can be moved in order to place food onto and remove food from the base. Although this device is capable of supplying water to the meat it cannot be modified by the cook to accommodate variously sized pieces of meat and requires a roasting pan of a particular size and configuration. As such, there remains room for variation and improvement within the art.

BRIEF SUMMARY OF THE INVENTION

Various features and advantages of the invention will be set forth in part in the following description, or may be obvious from the description, or may be learned from practice of the invention.

One aspect of one exemplary embodiment includes an automatic basting apparatus that has a base that defines a cavity. A basting fluid dispensing member is present and defines a passageway in communication with the cavity. The basting fluid dispensing member is rigid. The basting fluid dispensing member is configured for dispensing basting fluid out of an outlet of the passageway at an end of the basting fluid dispensing member. The outlet is oriented to have a component in both the horizontal direction and vertical direction.

An additional aspect of another exemplary embodiment exists in an automatic basting apparatus as immediately discussed in which a portion of the length of the basting fluid dispensing member has a shepherds hook configuration.

Another aspect of an additional exemplary embodiment is found in an automatic basting apparatus as previously mentioned in which the base has a conical portion so that the cavity of the base has a conical portion. The basting fluid dispensing member extends vertically from the base at a coincident location with an axis of the conical portion of the base.

One aspect of another exemplary embodiment resides in an automatic basting apparatus as discussed prior in which the base defines at least one aperture therethrough. The aperture is present for placing the cavity of the base in communication with an area outside of the base for transferring basting fluids from the area outside of the base into the cavity.

Another aspect of an exemplary embodiment is found in an automatic basting apparatus that has a first base that defines a first cavity. A first basting fluid dispensing member is present and defines a first passageway in communication with the first cavity of the first base. The first basting fluid dispensing member is configured for dispensing basting fluid therefrom. A second base defines a second cavity. A second basting fluid dispensing member defines a second passageway in communication with the second cavity of the second base. The second basting fluid dispensing member is configured for dispensing basting fluid therefrom.

A further aspect of an additional exemplary embodiment includes an automatic basting apparatus as immediately discussed that further includes a support member. At least a portion of the support member is disposed between the first base and the second base. The support member is configured for placement of food thereon for subsequent application of basting fluids to the food by the first basting fluid dispensing member and the second basting fluid dispensing member.

Another aspect of another exemplary embodiment resides in an automatic basting apparatus as mentioned prior in which the first passageway of the first basting fluid dispensing member has a first outlet configured for dispensing basting fluid therefrom. The first outlet is oriented to have a component in both the horizontal direction and vertical direction. The second passageway of the second basting fluid dispensing member has a second outlet configured for dispensing basting fluid therefrom. The second outlet is oriented to have a component in both the horizontal direction and vertical direction.

Another aspect of yet another exemplary embodiment includes an automatic basting apparatus as previously discussed in which the first basting fluid dispensing member is a tube such that the first passageway of the first basting fluid dispensing member is the hollow portion of the tube. The second basting fluid dispensing member is a tube such that the second passageway of the second basting fluid dispensing member is the hollow portion of the tube.

An additional aspect of another exemplary embodiment includes an automatic basting apparatus as previously set forth in which the first base has a first conical portion such that the first cavity of the first base has a first conical portion. The first basting fluid dispensing member extends vertically from the first base at a coincident location with an axis of the first conical portion of the first base. The second base has a second conical portion such that the second cavity of the second base has a second conical portion. The second basting fluid dispensing member extends vertically from the second base at a coincident location with an axis of the second conical portion of the second base.

Another aspect of one exemplary embodiment includes an automatic basting apparatus that has a first base that defines a first cavity that has a first conical portion. The first base defines at least one aperture therethrough for placing the first cavity in communication with an area outside of the first base for use in transferring basting fluids from the area outside of the first base into the first cavity. A first basting fluid dispensing member is present and defines a first passageway in communication with the first cavity of the first base. The first basting fluid dispensing member is rigid and has a vertically extending portion. The first passageway has a first outlet oriented to have a component in both the horizontal direction and vertical direction. A second base is included and defines a second cavity that has a second conical portion. The second base defines at least one aperture therethrough for placing the second cavity in communication with an area outside of the second base for use in transferring basting fluids from the area outside of the second base into the second cavity. A second basting fluid dispensing member is present and defines a second passageway in communication with the second cavity of the second base. The second basting fluid dispensing member is rigid and has a vertically extending portion. The second passageway has a second outlet oriented to have a component in both the horizontal direction and vertical direction. A support member engages the first basting fluid dispensing member and the second basting fluid dispensing member. The first basting fluid dispensing member and the second basting fluid dispensing member are capable of engaging the support member at different locations thereon to allow for adjustment of the distance between the first basting fluid dispensing member and the second basting fluid dispensing member. The support member is configured for placement of food thereon for subsequent application of basting fluids to the food by the first basting fluid dispensing member and the second basting fluid dispensing member.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE SEVERAL VIEWS OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 4 is a perspective view of an automatic basting apparatus in accordance with an alternative exemplary embodiment.

Figure 1:
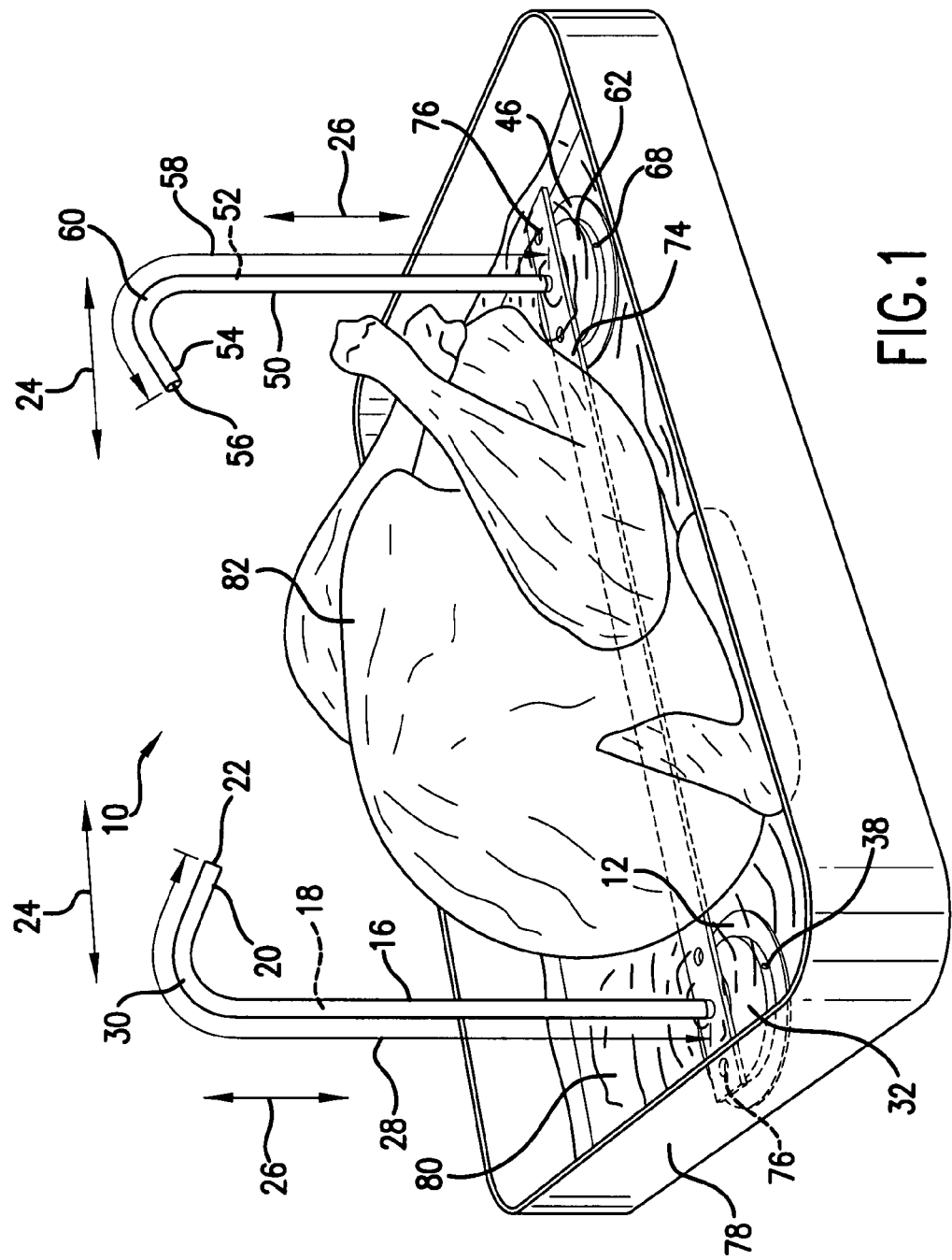
FIG. 1 is a perspective view of an automatic basting apparatus in a roasting pan that is used for basting an item of food in accordance with one exemplary embodiment.

Repeat use of reference characters in the present specification and drawings is intended to represent the same or analogous features or elements of the invention.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an automatic basting apparatus 10 that functions to automatically baste food 82 while being cooked. The automatic basting apparatus 10 includes one or more basting fluid dispensing members 16 through which basting fluid 80 is transferred by way of pressure for subsequent application to the food 82. As the basting fluid 80 is heated it is directed into a passageway 18 of the basting fluid dispensing member 16 and rises vertically. The basting fluid 80 flows through the passageway 18 and can exit via an outlet 22 that may be oriented at least partially in both the horizontal direction 24 and the vertical direction 26. Various configurations of the automatic basting apparatus 10 are provided in which multiple basting fluid dispensing members 16 are present. The automatic basting apparatus 10 thus functions to baste food 82 automatically to provide uniformity to the process and to conserve time otherwise spent by the cook.

FIG. 1 shows an automatic basting apparatus 10 in accordance with one exemplary embodiment of the present invention. The basting apparatus 10 is located inside of a roasting pan 78 that includes basting fluid 80. It is to be understood that as used herein the term basting fluid includes liquid and/or solid particles. For example, the basting fluid 80 may include water, salt, spices, and/or solid fat particles. The basting fluid 80 is transferred from the bottom of roasting pan 78 and dispensed from the basting fluid dispensing member 16 onto the surface of the food 82 that is being prepared. A second basting fluid dispensing member 50 is also present and likewise functions to deposit basting fluid 80 onto the food 82. Although described as having a pair of basting fluid dispensing members 16 and 50, it is to be understood that the automatic basting apparatus 10 may have varying numbers of basting fluid dispensing members in accordance with other exemplary embodiments. For example, the automatic basting apparatus 10 may have only a single basting fluid dispensing member in accordance with certain exemplary embodiments. Additionally, other embodiments are possible in which from three to ten basting fluid dispensing members are present in order to dispense basting fluid 80 to food 82.

Figure 2:
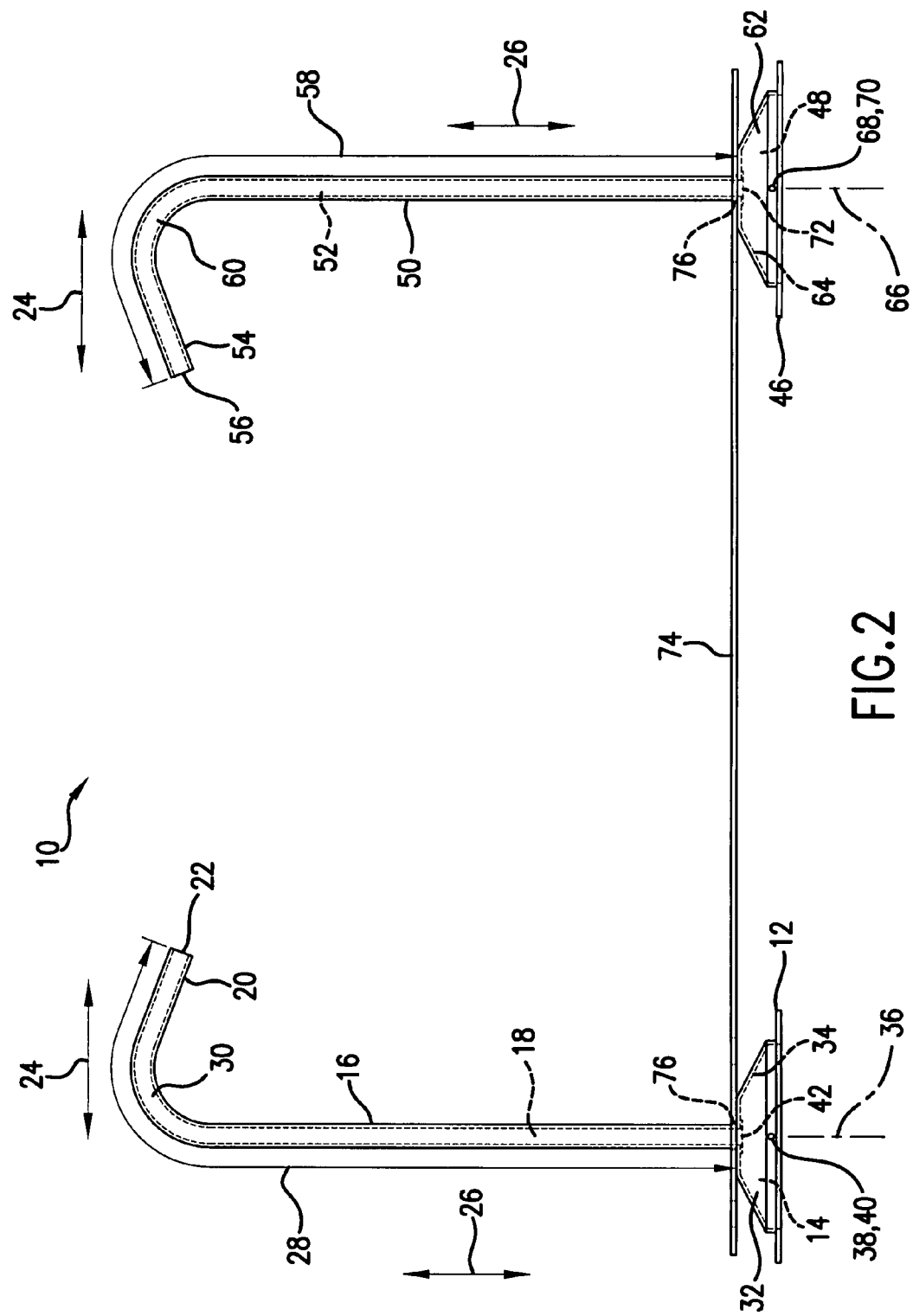
FIG. 2 is a side view of the automatic basting apparatus shown in FIG. 1.

A side view of the automatic basting apparatus 10 is shown in FIG. 2. The basting fluid dispensing member 16 has a passageway 18 that extends along its entire length 28. The basting fluid dispensing member 16 is a tube in which the passageway 18 makes up the hollow portion of the tube. However, it is to be understood that the basting fluid dispensing member 16 may be variously constructed in accordance with other exemplary embodiments. For example, the basting fluid dispensing member 16 can have a triangular, square or star shaped cross section. In these embodiments, the passageway 18 can be circular, triangular, square or star shaped. When constructed as a tube, the basting fluid dispensing member 16 can have a wall thickness of one millimeter and a passageway 18 diameter of one half of a centimeter. In accordance with other embodiments the wall thickness may be up to fifty millimeters and the diameter of the passageway 18 may be up to three centimeters.

A portion of the length 28 of the basting fluid dispensing member 16 includes a shepherd hook portion 30. However, it is to be understood that the shepherd hook portion 30 need not be included in other embodiments of the basting fluid dispensing member 16. Basting fluid 80 may travel upwards through a vertically extending portion of the basting fluid dispensing member 16 until reaching the shepherd hook portion 30 at which time it moves therethrough and to an outlet 22 located on an end 20 of the basting fluid dispensing member 16. The outlet 22 is arranged so as to be oriented in both the horizontal direction 24 and the vertical direction 26. In other words, the outlet 22 has a component in both the horizontal direction 24 and the vertical direction 26 so that it is not oriented completely in the horizontal direction 24 or completely in the vertical direction 26. With such an arrangement, basting fluid 80 can be desirably directed from outlet 22 in a direction that is oriented in both the horizontal and vertical directions 24 and 26. However, due to the consistency of the basting fluid 80 and/or the amount of pressure in passageway 18 the actual dispensing direction from outlet 22 may vary during use of the automatic basting apparatus 10. For example, the basting fluid 80 may simply drip downward in the vertical direction 26 from outlet 22 in certain embodiments. Although described as having a component in both the horizontal direction 24 and vertical direction 26 it is to be understood that other exemplary embodiments are possible in which the outlet 22 lacks one of these components. In one such embodiment the outlet 22 is a vertical outlet and opens downwardly in the vertical direction 26 and thus lacks a component in the horizontal direction 24. In another exemplary embodiment the outlet 22 opens completely in the horizontal direction 24 and thus lacks a component in the vertical direction 26.

The basting fluid dispensing member 16 is shown as having only a single outlet 22. In this regard all of the basting fluid 80 dispensed from the basting fluid dispensing member 16 can be directed out of the single outlet 22. This arrangement may be advantageous in that the exact location of dispensing of all of the basting fluid 80 is known and is dispensed with the maximum amount of pressure in the passageway 18. However, it is to be understood that other arrangements are possible in which the basting fluid dispensing member 16 has more than one outlet 22 through which basting fluid 80 may be dispensed. For example, up to five additional outlets may be included through the wall of the basting fluid dispensing member 16 at or after the shepherd hook portion 30. Additionally, up to ten additional outlets can be defined through the wall of the basting fluid dispensing member 16 in the rising vertical portion located before the shepherd hook portion 30.

Although described as including the shepherd hook portion 30, the length 28 of the basting fluid dispensing member 16 need not include this feature in accordance with other exemplary embodiments. In accordance with one such embodiment a ninety degree bend may be imparted into the basting fluid dispensing member 16 in order to direct the basting fluid 80 to a desired point of dispensing. The basting fluid dispensing member 16 may have a length 28 of varying distances in accordance with different exemplary embodiments. In accordance with one exemplary embodiment, the vertically rising portion of the basting fluid dispensing member 16 is ten inches in length, the shepherds hook portion 30 is two inches in length, and the portion after the shepherds hook portion 30 is one inch in length so that the total length 28 of the basting fluid dispensing member 16 is thirteen inches. However, other exemplary embodiments exist in which the length 28 may be from one inch to thirty six inches in distance.

The basting fluid dispensing member 16 is attached to a base 12 on one end thereof. The engagement between the basting fluid dispensing member 16 and base 12 may be variously constructed in accordance with various exemplary embodiments of the automatic basting apparatus 10. For example, the engagement may be permanent or the two components may be removably engaged in certain embodiments. The basting fluid dispensing member 16 can be attached to the base 12 through welding, riveting, adhesion or mechanical fasteners. Further, the basting fluid dispensing member 16 can be integrally formed with the base 12 so they are made essentially as one piece or they can be formed separately and subsequently attached. The basting fluid dispensing member 16 may be rigidly attached to the base 12 or may be capable of rotating at least some degree thereabout.

Figure 3:
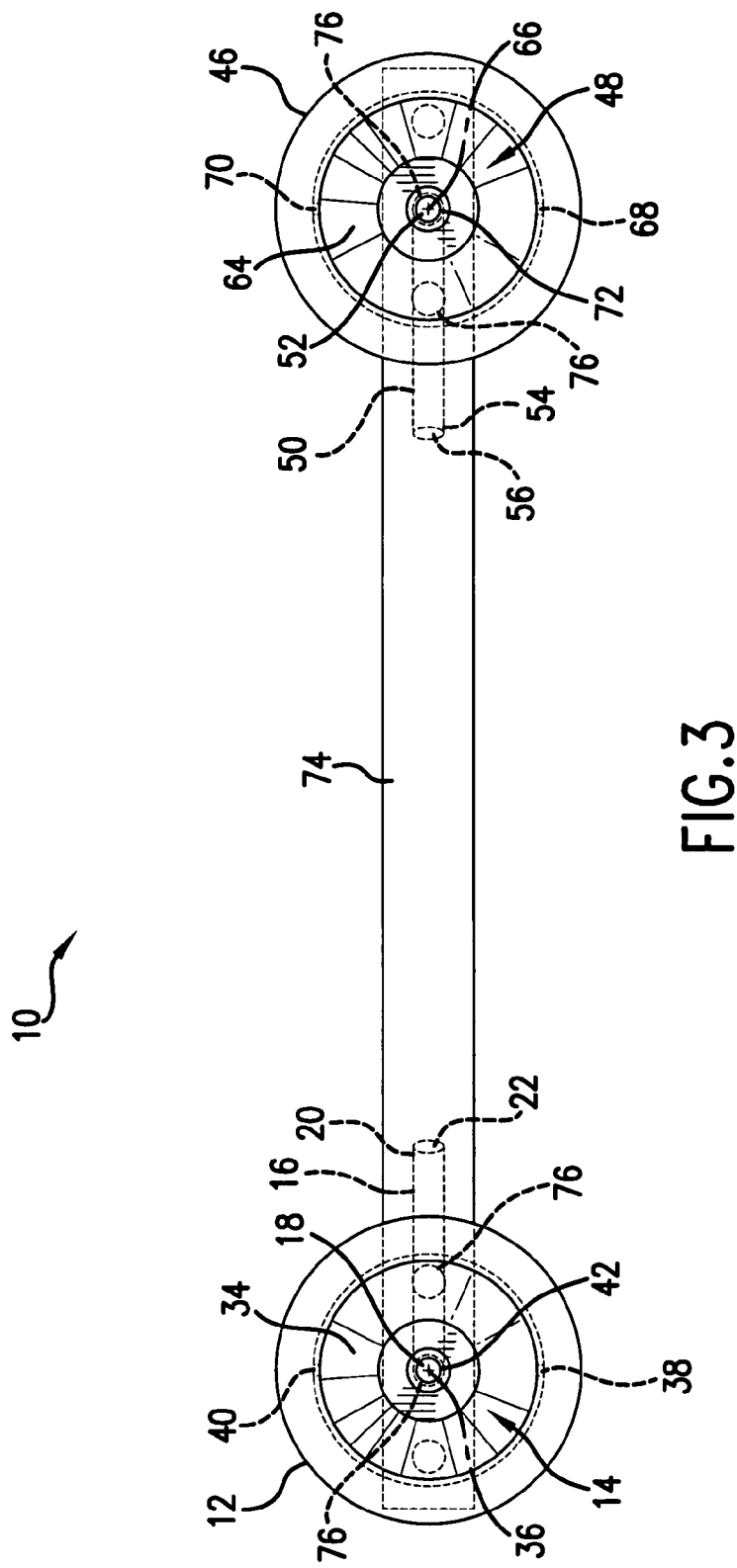
FIG. 3 is a bottom view of the automatic basting apparatus shown in FIG. 1.

The base 12 rests on top of the roasting pan 78 or other surface or area holding the basting fluid 80 during preparation of the food 82. The base 12 includes a conical portion 32 that has an axis 36. FIG. 3 shows a bottom view of the automatic basting apparatus 10 in which the bottom of the base 12 can be more clearly viewed. The bottom of base 12 defines a cavity 14. The cavity 14 can be variously shaped in other embodiments of the base 12 but is shown as having a conical portion 34 that is defined by conical portion 32. A pair of apertures 38 and 40 are defined in base 12 can place the cavity 14 in communication with the area on the outside of base 12. During use of the automatic basting apparatus 10 basting fluid 80 is allowed to flow from the roasting pan 78 into the cavity 14 by way of the apertures 38 and 40. Apertures 38 and 40 are shown as being in the shape of holes and are located one hundred and eighty degrees from one another about the axis 36 of the conical portion 32. Although two apertures 38 and 40 are shown it is to be understood that any number of apertures may be present in base 12 in accordance with other exemplary embodiments. For example, from one to ten apertures may be present. Additionally, the apertures need not be located symmetrically about the base 12 or provided in the shape of holes in accordance with various embodiments.

As stated, the apertures 38 and 40 are provided in order to allow basting fluid 80 to flow into cavity 14. However, in accordance with other embodiments the base 12 need not rest flatly against the roasting pan 78 so that basting fluid 80 may flow under the base 12 and into cavity 14. Further designs are possible in which basting fluid 80 may both flow through apertures 38 and 40 and also under the base 12 to enter the cavity 14. The basting fluid dispensing member 16 is located on the base 12 so that the inlet opening 42 of the passageway 18 is positioned on the axis 36 of the conical portion 32. Air bubbles will rise in basting fluid 80 when heated. The conical portion 34 acts as a funnel to channel the rising, heated basting fluid 80 to the inlet opening 42 for subsequent transfer through the length of passageway 18. Placement of the inlet opening 42 at the axis 36 of conical portion 12 provides an effective arrangement for funneling the heated basting fluid 80 upwards in the most efficient manner. However, it is to be understood that other arrangements are possible in which the inlet opening 42 is not located at the axis 36 but is instead at an alternative location on the base 12. Further, although described as having a conical portion 34 the cavity 14 need not have a conical portion 34 in accordance with other embodiments.

Basting fluid 80 in the roasting pan 78 is thus transferred into cavity 14 by way of apertures 38 and 40 and possibly under base 12. Rising air bubbles formed in the heated basting fluid 80, by way of the heating element acting upon the roasting pan 78, force basting fluid 80 upwards and into the inlet opening 42. Subsequently, the basting fluids are pushed through the length 28 of the basting fluid dispensing member 16 and out of outlet 22 onto food 82. The arrangement of the automatic basting apparatus 10 may cause the basting fluid 80 to be expelled from outlet 22 with a degree of force that may cause the basting fluid 80 to splatter off of the food 82 and onto surrounding surfaces. Should this occur, a cover (not shown) can be placed on top of the roasting pan 78 in order to prevent splashing of the basting fluid 80.

Although described as being a separate component from the roasting pan 78, the base 12 and basting fluid dispensing member 16 can be permanently or removably attached thereto or may be integrally formed therewith in accordance with certain exemplary embodiments. As such, in one exemplary embodiment the automatic basting apparatus 10 may include a roasting pan 78 that has a basting fluid dispensing member 16 formed therewith located on a sidewall.

FIGS. 1-3 show a second base 46 and a second basting fluid dispensing member 50 located opposite base 12 and basting fluid dispensing member 16. The second basting fluid dispensing member 50 may be arranged to dispense basting fluid 80 onto food 82 at a location different from or the same as the basting fluid dispensing member 16. In this regard the second basting fluid dispensing member 50 may include a second passageway 52 with a second outlet 56 on a second end 54 of the second basting fluid dispensing member 50 from which basting fluid 80 is dispensed. The second outlet 56 may be arranged to have a component oriented in both the horizontal direction 24 and the vertical direction 26 for orienting the dispensing direction of the basting fluid 80. A second shepherds hook portion 60 can be located along a portion of the second length 58 in order to provide the second outlet 56 with a component in the horizontal direction 24 and a component in the vertical direction 26.

The second base 46 can be provided with a second cavity 48. The second base 46 may have a second conical portion 62 that defines a second conical portion 64. Basting fluid 80 can enter the second cavity 48 through a pair of second apertures 68 and 70 and be directed towards a second inlet opening 72 of the second passageway 52 located at a second axis 66 of the second conical portion 64. In this regard, bubbles formed in the basting fluid 80 when heated will rise within the second cavity 48 and push basting fluid 80 through the inlet opening 72 and second passageway 52 to be dispensed out of the second outlet 56 and onto the food 82.

The arrangement, construction and functioning of the second base 46 and the second basting fluid dispensing member 50 may be the same as the base 12 and basting fluid dispensing member 16 and a repeat of these features is not necessary. It is to be understood, however, that the second base 46 and second basting fluid dispensing member 50 need not be constructed identically to the base 12 and basting fluid dispensing member 16 in certain embodiments. In this regard, the second length 58 may be different than the length 28, or the second shepherds hook portion 60 may not be present while the shepherds hook portion 30 is present. Although shown as employing a second base 46 and a second basting fluid dispensing member 50, it is to be understood that the automatic basting apparatus 10 need not include these components in accordance with other exemplary embodiments and may only include the base 12 and basting fluid dispensing member 16.

The automatic basting apparatus 10 includes a support member 74 that engages both the basting fluid dispensing member 16 and the second basting fluid dispensing member 50. The support member 74 includes a number of apertures 76 along its length through which the basting fluid dispensing member 16 and the second basting fluid dispensing member 50 can be disposed in order to effect attachment of these two components to the support member 74. As shown, the support member 74 rests on top of the base 12 and the second base 46. The support member 74 functions to position the basting fluid dispensing member 16 and the second basting fluid dispensing member 50 at a desirable position with respect to one another and to the food 82 that is being prepared. The food 82 can be placed on top of the support member 74 in order to be prevented from contacting the bottom of the roasting pan 78 and burning its bottoms surface through contact therewith during cooking. As such, the support member 74 may act to prevent the food 82 from being scorched by elevating it some distance. The length of the support member 74 can be made to include an arch to impart strength to the support member 74 to resist flexing downward when food 82 is placed thereon. In alternative arrangements, the weight of the food 82 or the design of the support member 74 may cause the support member 74 to contact the bottom of the roasting pan 78 so that the food 82 in turn may touch the bottom of the roasting pan 78.

Any number of apertures 76 can be located along the length of the support member 74. As shown, six apertures 76 are present although it is to be understood that up to twenty apertures 76 can be included in accordance with various exemplary embodiments of the automatic basting apparatus 10. The basting fluid dispensing member 16 and the second basting fluid dispensing member 50 can be disposed through various apertures 76 to vary their distance from one another to account for variations in the sizes of roasting pans 78 and food 82 used in conjunction with the automatic basting apparatus 10. Although shown as using apertures 76, the support member 74 may engage the basting fluid dispensing member 16 and the second basting fluid dispensing member 50 through various mechanisms such as welding, mechanical fasteners and slotted engagements. Although shown as employing a support member 74, it is to be understood that the support member 74 need not be present in other exemplary embodiments.

Various types of materials may be used in the construction of the automatic basting apparatus 10. For example, in accordance with one exemplary embodiment the base 12, basting fluid dispensing member 16, support member 74, second base 46 and second basting fluid dispensing member 50 are all made out of stainless steel. In other embodiments one or more of these components can be made of plastic, glass, ceramic or other suitable material.

An additional exemplary embodiment of the automatic basting apparatus 10 is shown in FIG. 4. The automatic basting apparatus 10 includes the basting fluid dispensing member 16, base 12, support member 74, second base 46 and second basting fluid dispensing member 50 as previously described in relation to the exemplary embodiment in FIGS. 1-3. Additionally included are a third base 84 and third basting fluid dispensing member 86 engaging a second support member 92 that likewise engages a fourth base 88 and fourth basting fluid dispensing member 90. The second support member 92 overlays the support member 74 and is of shorter length. The third and fourth basting fluid dispensing members 86 and 90 can engage the second support member 92 at various locations along the length of the second support member 92 to modify their distance from one another. Engagement of the second support member 92 with the third and fourth basting fluid dispensing members 86 and 90 can be made in a manner similar to that previously described in relation to the support member 74. The third and fourth basting fluid dispensing members 86 and 90 function to dispense basting fluid 80 onto the food 82 at additional locations to the ones of the basting fluid dispensing member 16 and second basting fluid dispensing member 50. The support member 74 and second support member 92 can be oriented at a ninety degree angle to one another so that their engaged components essentially surround the food 82 on all four sides.

The third base 84, third basting fluid dispensing member 86, fourth base 88 and fourth basting fluid dispensing member 90 can be arranged, constructed and can function in a manner similar to the base 12 and basting fluid dispensing member 16 as described above and a repeat of these features is not necessary. The various components of these elements can be identical to the base 12 and basting fluid dispensing member 16 or may be different in accordance with various exemplary embodiments. The support member 74 can be attached to the second support member 92 or these two elements may be separate components. Although shown as employing four basting fluid dispensing members 16, 50, 86 and 92 it is to be understood that other embodiments are possible in which any number of basting fluid dispensing members are present in the automatic basting apparatus 10.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An automatic basting apparatus, comprising:
  a base defining a cavity; and
  a basting fluid dispensing member defining a passageway in communication with said cavity of said base, wherein said basting fluid dispensing member is a single piece and is rigid and is non-removably attached to said base, and wherein said basting fluid dispensing member dispenses basting fluid out of an outlet of said passageway at a terminal end of said basting fluid dispensing member, wherein said basting fluid dispensing member has a vertically extending portion and a shepherds hook portion, wherein said shepherds hook portion is located between said vertically extending portion and said terminal end of said basting fluid dispensing member such that said passageway extends through and is completely surrounded by said vertically extending portion and said shepherds hook portion to said outlet at said terminal end, wherein the shepherds hook portion is immediately adjacent and contacts an upper end of the vertically extending portion, wherein said passageway has a curved direction of travel along the entire length of said shepherds hook portion from one end of said shepherds hook portion to an opposite end of said shepherds hook portion, wherein said basting fluid dispensing member has an end portion that is immediately adjacent and contacts said shepherds hook portion, wherein said passageway through said end portion has a straight direction of travel along the entire length of said end portion, wherein said terminal end is at said end portion.

2. The automatic basting apparatus as set forth in claim 1, wherein said basting fluid dispensing member has a length that is non-adjustable.

3. The automatic basting apparatus as set forth in claim 1, wherein said base and said basting fluid dispensing member are both made out of stainless steel.

4. The automatic basting apparatus as set forth in claim 1, wherein said basting fluid dispensing member is a tube such that said passageway of said basting fluid dispensing member is the hollow portion of the tube.

5. The automatic basting apparatus as set forth in claim 1, wherein said base has a conical portion such that said cavity of said base has a conical portion, and wherein said basting fluid dispensing member extends vertically from said base at a coincident location with an axis of said conical portion of said base.

6. The automatic basting apparatus as set forth in claim 1, wherein said base defines at least one aperture therethrough for placing said cavity of said base in communication with an area outside of said base for use in transferring basting fluids from outside of said base into said cavity.

7. The automatic basting apparatus as set forth in claim 1, wherein said passageway has a single inlet opening in communication with said cavity, and wherein said passageway has a single said outlet for dispensing basting fluid therefrom, wherein the basting fluid is dispensed directly onto food upon exiting said outlet at said terminal end.

8. An automatic basting apparatus, comprising:
  a first base defining a first cavity, wherein said first cavity has a conical portion and an axis extending through a center of said conical portion, wherein said first base defines at least one aperture therethrough for placing said first cavity in communication with an area outside of said first base for use in transferring basting fluids from outside of said first base into said first cavity, wherein said at least one aperture extends through a side of said first base such that a portion of said first base is present between a bottom of said first base and said at least one aperture, and such that a portion of said first base is present between a top of said first base and said at least one aperture, wherein said at least one aperture extends through said first base in a direction that has a horizontal component but does not have a vertical component;
- a first basting fluid dispensing member defining a first passageway in communication with said first cavity of said first base through an inlet opening that is located on the axis extending through said center of said conical portion of said first cavity, wherein said first basting fluid dispensing member dispenses basting fluid therefrom, wherein said first passageway extends upwards away from said first base in a vertical direction so as not to have a horizontal component and is then curved so as to extend in a direction having a component in both vertical and horizontal directions, wherein said first basting fluid dispensing member is attached to said first base so as to be non-removable;
- a second base defining a second cavity; and
- a second basting fluid dispensing member defining a second passageway in communication with said second cavity of said second base, wherein said second basting fluid dispensing member dispenses basting fluid therefrom.

9. The automatic basting apparatus as set forth in claim 8, wherein said first base, said second base, said first basting fluid dispensing member, and said second basting fluid dispensing member are made of stainless steel.

10. The automatic basting apparatus as set forth in claim 9, wherein said first passageway of said first basting fluid dispensing member and said second passageway of said second basting fluid dispensing member are not in communication with one another.

11. The automatic basting apparatus as set forth in claim 9, further comprising a support member at least a portion of which is disposed between said first base and said second base, wherein said support member has food thereon for application of basting fluids to the food by said first basting fluid dispensing member and said second basting fluid dispensing member, wherein the basting fluids are directly dispensed onto the food upon exiting said first basting fluid dispensing member.

12. The automatic basting apparatus as set forth in claim 11, wherein said support member defines a plurality of support apertures, wherein said first basting fluid dispensing member and said second basting fluid dispensing member are disposed through said support apertures of said support member for retention thereon, and wherein said support apertures are located on said support member to allow said first basting fluid dispensing member and said second basting fluid dispensing member to be retained onto said support member at various distances to one another.

13. The automatic basting apparatus as set forth in claim 9, wherein said first basting fluid dispensing member and said second basting fluid dispensing member are rigid.

14. The automatic basting apparatus as set forth in claim 9, wherein said first passageway of said first basting fluid dispensing member has a first outlet for dispensing basting fluid therefrom, wherein said first outlet is oriented to have a component in both a horizontal direction and a vertical direction, and wherein said second passageway of said second basting fluid dispensing member has a second outlet for dispensing basting fluid therefrom, wherein said second outlet is oriented to have a component in both the horizontal direction and the vertical direction.

15. The automatic basting apparatus as set forth in claim 9, wherein said first basting fluid dispensing member and said second basting fluid dispensing member each have a length that is non-adjustable, wherein a portion of the length of said first basting fluid dispensing member has a shepherds hook shape, and wherein a portion of the length of said second basting fluid dispensing member has a shepherds hook shape.

16. The automatic basting apparatus as set forth in claim 9, wherein said first basting fluid dispensing member is a tube such that said first passageway of said first basting fluid dispensing member is the hollow portion of the tube, and wherein said second basting fluid dispensing member is a tube such that said second passageway of said second basting fluid dispensing member is the hollow portion of the tube.

17. The automatic basting apparatus as set forth in claim 9, wherein said first base has a first conical portion and wherein said second base has a second conical portion such that said second cavity of said second base has a second conical portion, and wherein said second basting fluid dispensing member extends vertically from said second base at a coincident location with an axis of said second conical portion of said second base.

18. The automatic basting apparatus as set forth in claim 9, wherein said second base defines at least one aperture therethrough for placing said second cavity of said second base in communication with an area outside of said second base for use in transferring basting fluids from outside of said second base into said second cavity.

19. An automatic basting apparatus, comprising:
- a first base defining a first cavity that has a first conical portion and an axis extending through a center of said first conical portion, wherein said first base defines at least one aperture therethrough for placing said first cavity in communication with an area outside of said first base for use in transferring basting fluids from outside of said first base into said first cavity, wherein said at least one aperture extends through a side of said first base such that a portion of said first base is present between a bottom of said first base and said at least one aperture, and such that a portion of said first base is present between a top of said first base and said at least one aperture, wherein said at least one aperture extends through said first base in a direction that has a horizontal component but does not have a vertical component;
- a first basting fluid dispensing member defining a first passageway in communication with said first cavity of said first base through an inlet opening that is located on the axis extending through said center of said conical portion of said first cavity, wherein said first basting fluid dispensing member is rigid and has a vertically extending portion, wherein said first passageway has a first outlet oriented to have a component in both a horizontal direction and a vertical direction, wherein said first passageway extends upwards away from said first base in a vertical direction so as not to have a horizontal component and is then curved so as to extend in a direction having a component in both vertical and horizontal directions, wherein said first basting fluid dispensing member is attached to said first base so as to be non-removable;
- a second base defining a second cavity that has a second conical portion, wherein said second base defines at least one aperture therethrough for placing said second cavity in communication with an area outside of said second base for use in transferring basting fluids from outside of said second base into said second cavity;
- a second basting fluid dispensing member defining a second passageway in communication with said second cavity of said second base, wherein said second basting fluid dispensing member is rigid and has a vertically extending portion, wherein said second passageway has a second outlet oriented to have a component in both a horizontal direction and a vertical direction; and a support member engaging said first basting fluid dispensing member and said second basting fluid dispensing member, wherein said first basting fluid dispensing member and said second basting fluid dispensing member are capable of engaging said support member at different locations thereon to allow for adjustment of the distance between said first basting fluid dispensing member and said second basting fluid dispensing member, wherein said support member has food thereon for application of basting fluids to the food by said first basting fluid dispensing member and said second basting fluid dispensing member.

* * * * *

UNITED STATES PATENT AND TRADEMARK OFFICE
CERTIFICATE OF CORRECTION

PATENT NO. : 7,946,221 B2
APPLICATION NO. : 11/807071
DATED : May 24, 2011
INVENTOR(S) : Hull, Jr.

It is certified that error appears in the above-identified patent and that said Letters Patent is hereby corrected as shown below:

Col. 11 line 28, the number "9" should read --8--.
Col. 11 line 33, the number "9" should read --8--.
Col. 11 line 52, the number "9" should read --8--.
Col. 11 line 55, the number "9" should read --8--.
Col. 11 line 65, the number "9" should read --8--.
Col. 12 line 5, the number "9" should read --8--.
Col. 12 line 12, the number "9" should read --8--.
Col. 12 line 20, the number "9" should read --8--.

Signed and Sealed this
Twelfth Day of July, 2011

David J. Kappos
*Director of the United States Patent and Trademark Office*